United States Patent Office 3,460,787
Patented Aug. 12, 1969

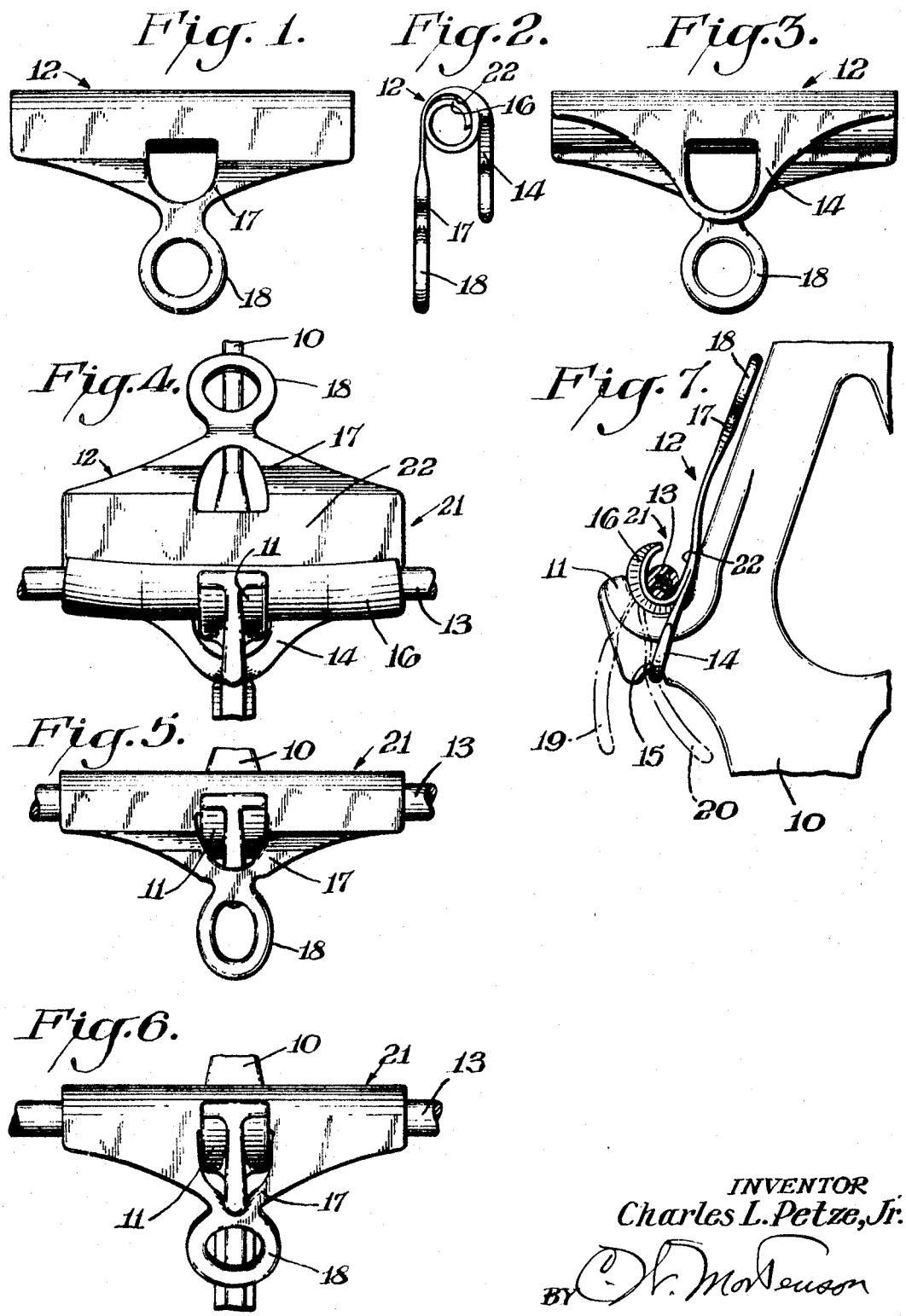

3,460,787
CABLE GUARD
Charles L. Petze, Jr., New Castle, Del., assignor to Delaware Research & Development Corporation
Filed Apr. 13, 1967, Ser. No. 630,575
Int. Cl. F16l 3/02
U.S. Cl. 248—60       6 Claims

ABSTRACT OF THE DISCLOSURE

Distribution cables are frequently supported using cable spacers bearing saddles in which the cables rest. This invention provides guards that grip the spacer and that have a holding, protective element for the cable.

As is well known, aerial cables carrying electrical power are suspended from poles and towers in fairly close proximity. Spacers attached to a messenger or carrier wire, which may be grounded, are used to support and separate the insulated phase conductors. For example, in a mile of suspended cables there may be used two hundred or so spacers, each of which is functioning also as an insulator. Thus, at two hundred or so places the possibility of capacitive coupling to ground is increased, and possible damage of the cable is increased because a given spacer may be improperly designed or contain a poor or faulty dielectric material. Use of spacers necessarily increases the probability of service failure, for some spacers are known to be trouble makers since breakdowns occur at or close to the junction of the spacer and the cable.

In addition, the devices that have been used to bind the cables to the spacers are known to act as foci leading to damage to the all-important insulation on the conductor. Such devices include hand-wrapped ties of bare or neoprene-covered wire, plastic rods formed into elongated coils, and O-rings. These devices often grip the cable tightly, deforming and distorting the insulation on the conductor. They also prevent uniform surface conditions on the cable, permitting some of the conductor insulation to become contaminated by liquid and solid matter to an extent greater than other portions. The resulting non-uniform surface resistances of these areas provide foci for electrical discharges that damage and degrade the cable, impairing its durability and operating usefulness.

Accordingly, an aim of this invention is the provision of a device that reduces the possibilities of failures. Another purpose is the provision of a device that acts as a cushion for a cable and reduces the effect of abrasion between the cable and the spacer. Another objective is the mounting of the cables so that electrical side effects and contamination effects are reduced. These and other goals will appear hereinafter.

The objectives of this invention are accomplished by the provision of a cable holder or guard that comprises a flexible gripping element that has two coacting means for gripping respective parts of a spacer that is to support the cable and the guard and unitary with the gripping means is a means for encircling that part of the cable adjacent to the spacer. The gripping elements that are used for anchoring the guard to the spacer are flexible and elastic. The encircling means comprises a roll or curved member of resilient material that can be unrolled to afford access of the cable into the roll or member and that, due to its resilience, rolls up upon release thereby encircling the cable. This roll is generally of a substantial length so that a substantial length of cable is encircled, for this leads to the desired minimizing of side effects.

The invention will be further understood by reference to the description below and to the drawings, all of which is given for illustrative purposes only and is not limitative.
In the figures:
FIGURE 1 is a front elevation of a device of this invention with the cable encircling portions in the rolled up position and showing one of the spacer gripping elements;
FIGURE 2 is an end view of a device of this invention shown in FIGURE 1;
FIGURE 3 is the rear view of the device shown in FIGURE 1;
FIGURE 4 is a view showing a cable spacer, in fragmentary form, bearing a device of this invention which has been partially mounted on the spacer and is in open form to receive the cable;
FIGURE 5 is a view similar to that of FIGURE 4 but showing the cable positioned in the guard and the second cable gripping element about to grip the saddle;
FIGURE 6 is a view similar to that of FIGURE 5 showing the second gripping means in position; and
FIGURE 7 is a side view, partially in section as to the guard, demonstrating again the position of FIGURE 4 and to indicate by the phantom lines the successive encircling and locking steps.

Shown in FIGURE 7 in a fragmentary manner is a cable spacer 10 with a saddle 11 containing a guard 12 of this invention which has been partially mounted on the spacer 10 and is in open position having just received cable 13 and is about to grip and protect cable 13 by encircling it as will be explained below.

The cable spacer 10 is substantially symmetrical and non-metallic, and it is to be appreciated that at the top end thereof, not shown, is a means for mounting the spacer to a messenger wire on which the spacer hangs and that generally there are three saddles 11 on the spacer each of which supports a cable 13. It is also to be appreciated that the spacer preferably used in conjunction with the devices of this invention have as high an impedance as possible and are made of durable, hydrophobic materials that resist dirt accumulation and attack by corona discharge and by weather conditions. Such materials include polypropylene, polypropylene copolymers with ethylene, polymethylmethacrylate and polyethylene. The spacings of the three cables are at a maximum and other spacings are such as minimize foci for corona and to maximize flashover voltage.

While the advantages of such a spacer as just described are very substantial, further protection is desired and is attained by the device of this invention. It will be noted in FIGURE 7 that the guard 12 lies in the saddle 11 of the spacer 10 and that cable 13 lies within the guard 12. In mounting the guard 12 on the cable the gripping element 14 as shown in FIGURES 3, 4 and 7 is first placed around saddle 11. Element 14 is, in effect, a hole or a loop or a ring contained in device 12, and it is stretched to force the saddle through it. The bottom-most portion of the loop 14 is held by the bottom of the saddle or a groove 15 in said bottom. This step places the guard 12 on the spacer in the portion shown in FIGURE 4. Depending upon the length and resiliency of the lower roll member 16 it will be more or less opened or closed, and in some devices of this invention 16 will substantially encircle cable 13 in the position given in FIGURE 7.

In the next step the second gripping element 17 (FIGURES 1, 4, 5 and 6) is brought downwardly to encircle saddle 11 and lock in groove 15 alongside of gripping element 14. It will be noted that elements 14 and 17 are similar in size and shape and are symmetrically disposed on guard 12. Element 17 has an extension 18 on it to facilitate one's pulling it downwardly as shown by phantom lines 19 and 20. This may be in the form of a tab or solid extension or as a finger loop as depicted. As shown in FIGURE 6, the final position, extension 18 merely hangs below saddle 11 and is available for reversing the actions if and when the need arises.

As can be seen from the figures, the encasing element 21 comprises a long tubular, roll-like element 20 that is adjacent to gripping element 14 and the encasing portion 22 adjacent grip 17. The encasing element 21 is made substantially long so that a relative long length of cable is enclosed and protected. By this means, the length of saddle support is in effect increased and an extensive cushion is made available for the cable. Abrasion on the cable is reduced and the usual deformation on the cable caused by conventional ties such as wire coils are avoided. Further, the distance between the phase cables and the distance between the exposed surface of a given phase cable and the messenger is increased so that the paths for "leakage" currents between same are substantially increased. The additional insulation increases the resistance of the assembly to puncture by lightning and voltage surges in the lines and it takes the effect of flashovers away from the saddle area. The voltage gradient is minimized at the spacer as is contamination there by dirt, water or ice. All of these advantages afford a long-lasting arrangement with a minimum number and occurrence of problems.

The sleeve retainer of this invention can be made of any of the numerous natural or synthetic resilient materials that are commercially available including those named above of which the spacer may be made. The preferred material is a chlorosulfonated polyethylene, available commercially from the E. I. du Pont de Nemours and Co., Inc., and known as "Hypalon." The polymeric materials may be suitably pigmented or filled, and the device is conveniently formed as an integral unit by conventional molding techniques. An economical device is thus made available and savings are afforded through its use for the reasons given above.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. A cable holder for protecting a cable to be supported by a cable spacer comprising a flexible gripping element having two coacting means for gripping the respective part of said spacer which is to support said cable to be protected; and unitary with said gripping means a cable encircling means which comprises a curved section of resilient material which is capable of being unrolled to afford access for said cable and capable of rolling up to encase a section of said cable.

2. A cable holder in accordance with claim 1 which comprises two gripping means separated by said encircling means.

3. A cable holder in accordance with claim 2 in which said encircling means comprises a substantial length of a roll of resilient material affording a means to encircle and protect a substantial length of said cable.

4. A cable holder in accordance with claim 1 in which each of said gripping means comprises an aperture in said holder through which said respective supporting part can pass.

5. A device in accordance with claim 4 in which the gripping element last to be activated is attached to an extension affording a pulling element as a means of forcing gripping element over said respective supporting part.

6. A device in accordance with claim 1 in combination with a cable spacer.

References Cited

UNITED STATES PATENTS

| 2,116,957 | 5/1938 | Barnes | 248—65 |
| 3,204,901 | 9/1965 | Dunn | 248—74 |
| 3,300,576 | 1/1967 | Hendrix | 248—61 X |

OTHER REFERENCES

Quanah Co. publication, 4 pages, dated 1964, of Elk Eng. Co., Paoli, Pa. (Fig. 8, p. 4).

CHANCELLOR E. HARRIS, Primary Examiner

U.S. Cl. X.R.

174—146, 173; 248—74